F. W. RUSSELL.
SCREW DRIVING MECHANISM.
APPLICATION FILED JAN. 17, 1912.
1,082,771.
Patented Dec. 30, 1913.
2 SHEETS—SHEET 1.
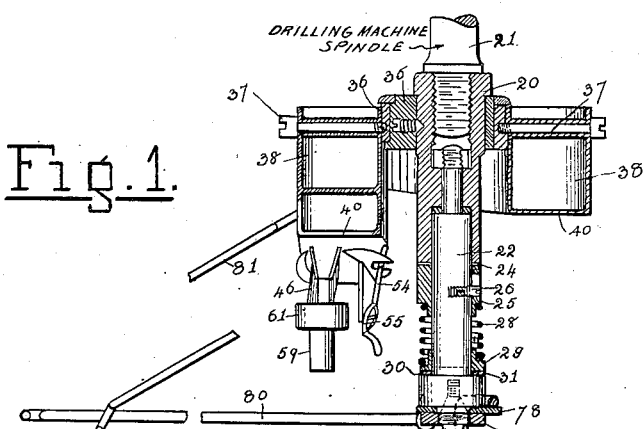
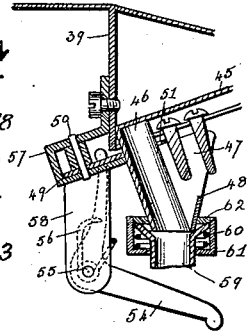
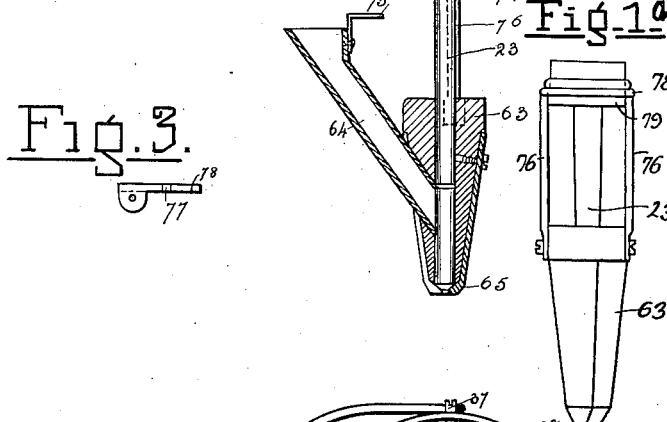
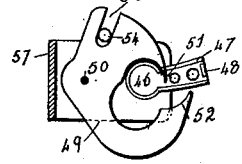
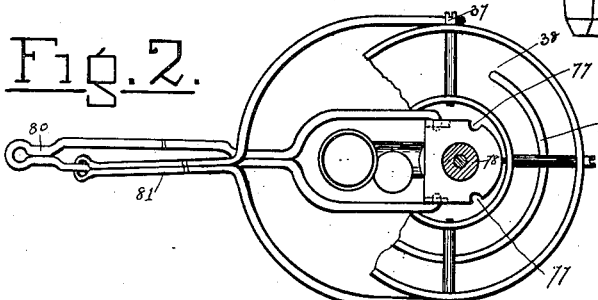
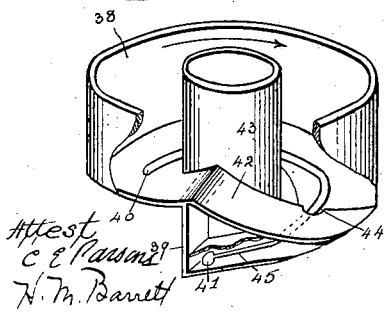
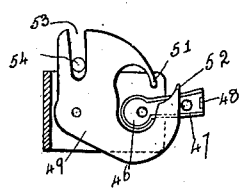

F. W. RUSSELL.
SCREW DRIVING MECHANISM.
APPLICATION FILED JAN. 17, 1912.
1,082,771.
Patented Dec. 30, 1913.
2 SHEETS—SHEET 2.
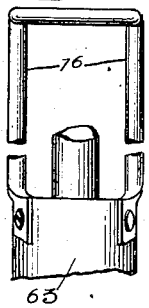
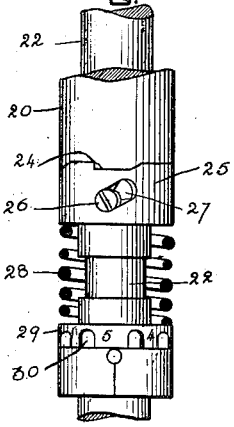
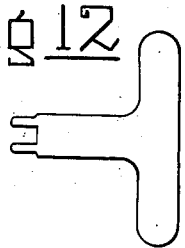
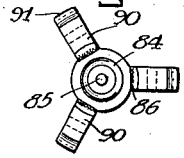
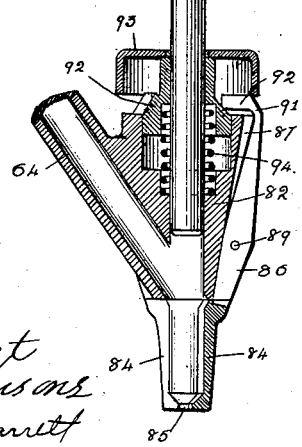
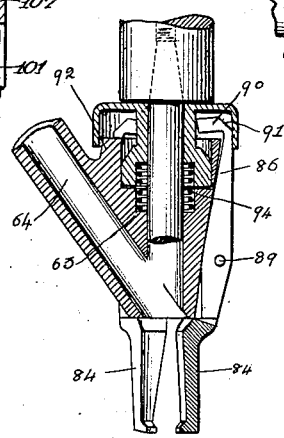
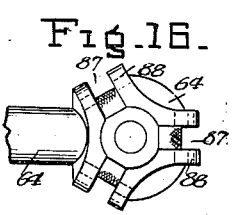
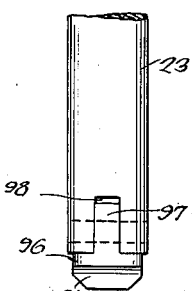
Attest
C. E. Parsons
H. M. Barrett
Inventor
Frederic William Russell
by Spear, Middleton, Donaldson & Spear
Attys.

UNITED STATES PATENT OFFICE.

FREDERIC WILLIAM RUSSELL, OF REDDITCH, ENGLAND.

SCREW-DRIVING MECHANISM.

1,082,771. Specification of Letters Patent. Patented Dec. 30, 1913.

Application filed January 17, 1912. Serial No. 671,677.

*To all whom it may concern:*

Be it known that I, FREDERIC WILLIAM RUSSELL, a subject of the King of England, residing at 135 Hewell road, Redditch, Worcestershire, England, have invented certain new and useful Improvements in Screw-Driving Mechanism, of which the following is a specification.

This invention has for its object the production of an efficient and inexpensive screw-driving mechanism which shall be an entirely self-contained attachment adapted to be used in an ordinary sensitive drilling machine, to which it may be secured merely by fixing its shank in the machine spindle or chuck, as in the case of an ordinary drill or certain well known tapping and stud setting devices; no other attachment to, nor any modification of, an ordinary drilling machine being required.

The screw-driving mechanism herein referred to is designed to have self feeding of screws, and is primarily intended to deal with ordinary wood screws having either round or countersunk slotted heads, but it will be understood that the device may also be used for inserting suitably shaped screws into tapped holes in metal articles. As in such work it is frequently necessary to drive successive screws into pieces of work of different heights from the machine table, I particularly desire to produce a device in which the delivery member shall automatically be brought into correct position relative to the work, thus avoiding the necessity of separately adjusting either the machine table or the delivery member to each variation in the work, before a screw can be driven; as is the case in certain existing screw-driving mechanism.

In order to explain clearly this my invention I have appended hereunto three sheets of drawings with figures and numbers of reference, each number denoting the same thing or part through the various views.

Figure 1 is a sectional elevation, and shows the general arrangement of a screw-driving mechanism made according to my invention. Fig. 2 is a plan showing the tail rods and the attachment of their forks to the non-revolving members. Fig. 3 is a side view of the guide plate. Fig. 4 is a perspective view of the supply bin, part of one side being broken away to expose the interior. (Figs. 5 to 11 are drawn to an enlarged scale.) Fig. 5 is a sectional view of the escapement mechanism, and shows the same as arranged in connection with the supply bin. Figs. 6 and 7 are plans of the escapement device. Fig. 8 shows the guide stirrup attached to the delivery member. Fig. 9 is a plan of the guide stirrup. Fig. 10 shows the clutch mechanism. Fig. 11 illustrates the torsion-adjusting device. Fig. 12 is a view of the peg key used in connection with the torsion adjusting device. Fig. 13 is a sectional elevation of another form of a screw-driving delivery member. Fig. 14 is a similar view, but shows the mechanism in an altered position, part of the screw-driving spindle being broken away. Fig. 15 is a plan of the three jaws of the screw-driving delivery member, and Fig. 16 is an inverted plan of the body of the said member. Figs. 17 and 18 are respectively side and end elevations of the lower end of the screw-driving spindle, provided with a floating tip. Fig. 19 is a similar view of Fig. 18, but shows the spindle partly in section in order to clearly expose the sliding shank of the tip.

In the accompanying drawings 20 is a continuously revolving member which may be of cylindrical form, and is adapted at its top end to be readily attached to the chuck or, as in the example selected for illustration, spindle end 21 of an ordinary sensitive drilling machine. Extending downward from the continuously revolving member 20 is the intermittently revolving member 22. The attachment of the member 22 to the member 20, is such as to provide a bearing which permits the two members to revolve independently of one another, but at the same time maintains them strictly in line, at prevents "end play" or independent longitudinal movement.

The lower end of the continuously revolving member 20 is provided with suitable clutch teeth 24 which are adapted to engage with similar teeth formed upon the clutch collar 25 which is movably mounted upon the intermittently revolving member 22. The movements of the clutch collar 25 are guided and limited by its angular slot 27 (Fig. 10) working upon the pin 26 which projects fixedly from the intermittently revolving member 22.

Adjacent to the clutch collar 25 and usually arranged loosely to inclose a portion of the intermittently revolving member 22, immediately below the said clutch collar, is the spiral spring 28, one end of which is secured to the clutch collar while the other end is attached to the torsion-collar 29. The torsion-collar 29 is securely but adjustably mounted upon the intermittently revolving member 22 and may have its bottom surface abutting upon the upper edge or shoulder of an enlarged portion or boss formed upon the said intermittently revolving member. Extending downward from the lower end of the intermittently revolving member 22 and rigidly secured thereto, is the screw-driving spindle 23, of which the lower extremity 34 is adapted to engage with ordinary slot-headed screws.

The bottom surface of the torsion-collar 29 may be provided with a number, usually eight, of radial grooves or channels 30, one or more of which are normally engaged by suitable projections from the intermittently revolving member 22; such projections may conveniently consist of a pin 31 driven into the intermittently revolving member immediately above its boss hereinbefore referred to. Also upon this same boss is marked a single longitudinal zero line 32 which normally is in agreement with one of a series of numerals which are marked upon the outside surface of the torsion-collar between the grooves therein, and agreeing in number with the said grooves. At the top end of the zero line and immediately adjacent to that edge of the boss upon which the torsion-collar abuts, is a small groove or hole 33 cut radially into the boss.

Mounted fixedly upon the continuously revolving member 20 and near the upper end thereof, is the eccentric sheave 35, upon the circumference of which is the ring or bush 36, so fitted as to form a bearing in which the eccentric sheave may revolve freely. Secured to the outside of this bush 36 (for instance by means of four stay bolts 37) and so surrounding the continuously revolving member, is the supply bin 38 which is an annular receptacle open at the top and having a bottom which forms one turn of a right-hand spiral, the lowest point of the bottom being approximately underneath the highest point thereof, the upper and lower ends of the bottom usually being connected by a vertical and radial end plate 39. The bottom of the annular supply bin need not in all cases be a spiral of uniform pitch; I may if desired allow a certain portion of the bottom to be quite flat, and I usually make the lower side of the spiral, for a certain distance from its junction with the end plate 39, to incline at an angle considerably increased beyond that of the rest of the said spiral. A circumferential slot 40 is formed in the bottom of the annular supply bin 38, usually about mid-way between the inside and outside walls. This slot may commence at any suitable point near the higher side of the spiral bottom, and terminates in the round hole 41 at the lower end of the spiral bottom, immediately inside the end plate 39. The annular supply bin may also be provided with a return plate 42 which forms a segment of a left hand spiral and constitutes a sort of inner bottom to a portion of the said annular bin, the upper end of the return plate abutting upon the upper end of the annular and spiral bottom hereinbefore described, and the lower end meeting the inclining side of the said bin bottom at a suitable position 43. A cavity 44 is provided in the lower end of the return plate, near its junction with the slotted bottom of the bin, in such a way as to form a sort of arch across the said slot 40. I also may provide a head plate 45 which is situated above and near to, and parallel with the lower end of the bin bottom, and extends from the end plate 39 to a position near the juncture of the return plate 42 with the said bin bottom. This head plate 45 is shown in the drawings partly broken away in order to expose the slot 40 and hole 41.

At the lower end of the spiral bottom of the supply bin, in immediate proximity to the end plate 39 is the small tubular part 46, the top end of which fits into the hole 41 in the bottom of the bin, the tube 46 being approximately at right angles to the surface of that portion of the spiral in which the hole 41 is situated, and the top end of the said tube abutting upon the under side of the head plate 45. This tube 46 has a longitudinal opening in its upper side, that is the side which faces toward the circumferential slot 40 in the bin bottom. The two edges of the said opening in the tube 46 are provided for a suitable part of their length with side plates or wings 47. Joining together the lower portions of the two wings 47 is the baffle plate 48 which is arranged at an angle with the longitudinal direction of the tube 46 in such a manner that the bottom end of the baffle plate coincides with the circumference of the tube, but its top end is some distance outside such circumference.

Embracing the tube 46 immediately below the bottom of the supply bin and above the upper edges of the wings 47, is the escapement 49, which is a flat piece of metal suitably mounted upon a center pin 50 about which it may have a certain amount of movement in its own plane. The escapement is provided with projections 51 and 52 adapted to control the opening into the tube 46, and also with a slot 53 which accommodates one end of the crank lever 54 which works upon a fulcrum pin 55 and is acted upon by a suitable spring 56 (indicated by dotted lines).

The tubular part 46 and the escapement center pin 50 may both be supported by a bracket 57 which may also support the crank lever fulcrum 55 by means of a suitable lug 58.

Extending downward from the tubular part 46 is the deflection tube 59 which may conveniently be flanged and bell mouthed at its top end which is pressed by a short spiral spring 60 supported by a union nut 61 against the under face of a flange 62 which is mounted or formed upon the tubular part 46 at or near its lower end.

Mounted upon the screw-driving spindle 23 is the delivery member, the body 63 of which according to Fig. 1 approximates to a cone in shape and is bored through vertically to form a bearing in which the screw-driving spindle may both revolve and slide freely. Extending in an upward and slanting direction from the body of the delivery member is the downtake tube 64, the upper end of which is made bell-mouthed or funnel-shaped. The bore of the downtake tube 64 runs into the vertical bore of the delivery member body. The bore of the downtake tube is slightly larger than the vertical bore in the delivery member body. The bottom end or nozzle of the delivery member is provided with a number (usually three) of suitable yielding jaws 65. Suitably and rigidly connected with the downtake tube 64 is the small horizontal plate or flat topped bracket 75.

Secured to the delivery member body at 76ª are two vertical guide bars which may suitably consist of the two sides of a stirrup 76, the top of which is square with the sides but is bowed outward so as to clear the continuously and intermittently revolving members 20 and 22. The vertical sides of the guide stirrup 76 are accommodated in suitable holes or slots 77 formed in the guide plate 78, the bowed top of the stirrup being above the said guide plate which is mounted upon the intermittently revolving member 22, so as to be a revolving fit. The guide plate may suitably be kept in position by the lower edge of the boss on the member 22 hereinbefore referred to, and a collar or knurled nut 79.

In order to prevent the delivery member from revolving with the screw-driving spindle, I provide a tail rod 80 which may conveniently be forked and may be secured directly to the delivery member, although I usually prefer to attach it to the guide plate 78 as shown in the drawings. It is also required to prevent the supply bin 38 from revolving, and for this purpose I may provide a second tail rod 81, one end of which is suitably attached to the supply bin, as for instance by being forked and hinged upon the extended heads of two of the stay bolts 37. The other or outward end of this tail rod 81, may conveniently be attached loosely to a suitable portion of the lower tail rod 80 hereinbefore referred to.

The action of a magazine screw-driving machine attachment made according to Figs. 1–11 is as follows:—The shank 21 is secured in the spindle or chuck of an ordinary sensitive drilling machine, and the tail rod 80 is allowed to rest against the frame-work or column of such a machine; the end of the said tail rod may be supported by a piece of string or wire should the construction of the machine be such as to render this desirable. On the machine being set in motion the continuously revolving member 20 is caused to revolve, and transmits its motion to the intermittently revolving member 22 and screw-driving spindle 23, by means of the clutch 24, spiral spring 28, and torsion collar 29; the spring 28 being wound up so as to offer considerable torsional resistance. The delivery member does not revolve owing to the guide stirrup 76 and guide plate 78 being held by the tail rod 80. The supply bin also is prevented from revolving by means of the tail rod 81, but owing to the eccentric 35 revolving with the member 20, an eccentric or irregular sifting motion is imparted to the said supply bin. A number of screws, as for instance one gross, of the size and pattern with which the device is constructed to deal, may be deposited in the supply bin 38, and owing to its sifting motion are caused to slide and roll around in it in the direction indicated by an arrow in Fig. 4. Many of the screws fall into the slot 40 which is large enough to loosely inclose the necks of the screws, but will not allow the heads to pass; consequently these screws hang point downward from the bottom of the bin and move circumferentially along the slot. On reaching the lower end 43 of the return plate 42, such screws as remain uncaught by the slot, slide or roll up the incline of the said return plate and are so sifted around until they fall into the slot, when their heads are able to pass through the gap or arch 44, so that such screws continue to travel down the spiral until the foremost one is arrested by the point 51 which is normally in the position shown in Fig. 6. Screws between the escapement and the arch 44 are prevented from riding or shaking up by the head-plate 45. Upon the operator lowering the drilling machine spindle, the delivery member nozzle comes in contact with, and is arrested by, the object into which screws are to be driven, and this screw-driving spindle slides downward into the said delivery nozzle thus closing the bottom of the downtake tube 64. This movement brings the bracket 75 into contact with the lower end of the crank lever 54, causing the latter to move upon its fulcrum, and by means of the slot 53, brings the escapement into the position shown in Fig. 7. By these means the foremost screw is allowed to slide into the tube 46, while the next screw is arrested by the point 52 of the escapement. It will be seen that as the bracket 75 is approached by the crank lever 54 the funnel shaped top of the downtake tube 64 incloses the bottom end of the deflection tube 59 (which owing to its flexible mounting allows for the sifting motion of the supply bin), consequently, as a screw is passed by the escapement there is a practically continuous tube down which it slides point foremost until it is arrested by the screw-driver spindle at the bottom of the downtake tube. The operator now raises the drilling machine spindle and thus withdraws the screw-driving spindle, allowing the screw to fall into the delivery nozzle, where it hangs by its head with its point protruding through the small central hole in the bottom of the nozzle. The work is placed upon the machine table so that the protruding end of the screw points upon the desired position, and the operator again lowers the machine spindle so that the end of the screw-driving spindle 23 comes in contact with the head of the screw, the ridge 34 engaging the slot of such screw and driving it into the work. When the screw is driven firmly home into the work, it offers to the screw-driving spindle such resistance as to overcome the torsion of the spiral spring 28. The screw-driving spindle and the intermittently revolving member become stationary, and the clutch collar 25 driven by the continuously revolving member 20 attempts to over run them and further wind up the spring. But as soon as the clutch collar 25 commences to over run the intermittently revolving member 22, the pin 26 acting in the slot 27 draws the clutch collar down and so disengages the clutch teeth 24. But the clutch collar thus being released from the driving power of the continuously revolving member, the spring re-asserts itself and the clutch is reëngaged only to be thrown out of gear again, and again reëngaged, thus producing a chattering sound which notifies the operator that the screw is driven home. As one screw is being driven into the work, another screw is passed by the escapement and slides to the bottom end of the downtake tube, from which it drops into the nozzle as the spindle is raised; thus each successive lowering of the machine spindle after the first, drives a screw, until the supply bin is empty. The spring 56 causes the escapement to return to the position shown in Fig. 6, each time the crank lever is withdrawn from contact with the bracket 75. The wings 47 guide the lower ends of the screws into the tube 46 and the baffle plate 48 counteracts a tendency of the screws to fall head foremost as they are passed by the escapement. The withdrawal of the screw-driving spindle from the delivery member is limited by the bowed top of the guide stirrup 76 resting upon the guide plate 78.

The torsion of the spiral spring 28 may be adjusted by lifting the torsion collar 29 free from the projection 31 and turning the said collar upon the intermittently revolving member 22 according to requirements, and then allowing it again to engage with the projection 31. This operation may conveniently be accomplished with the aid of a peg key Fig. 12 one peg being inserted in the hole 33 while the other peg enters one of the adjacent grooves 30.

It will be understood that in order to insure the screw-driving blade readily engaging with the slot in the screw-head, the tube in which this takes place must be of approximately the same diameter as such screw heads. But I have found it to be the case that a considerable proportion of ordinary wood screws have their heads of slightly faulty and irregular formation, some being above their standard in size and some having their slots not quite central. The heads of such faulty screws if introduced into a screw-driving mechanism are liable to jam in the delivery tube, causing frequent delay and sometimes considerable damage to the mechanism.

In Figs. 13 to 16 an improved delivery member is shown which shall be able to deal with faulty screws without danger or delay or injury. 63 is the delivery member body in the central bore of which the screw-driving spindle may slide and revolve freely. Extending in an upward and slanting direction from the lower part of the body is the supply tube 64 the bore of which is somewhat larger than the vertical bore in the body. Extending downward from the bottom end of the body is the nozzle which in this case consists of a number, usually three, of jaws 84 so shaped that when in their normal position as shown in Fig. 13 they inclose a complete cylindrical space which forms a continuation of the vertical bore of the body, and in which the screw-driving spindle may slide and revolve. The bottom ends of the jaws project radially inward so as to restrict the bottom outlet from the inclosed cylindrical chamber, and thus provide (when in the normal position) the small central hole 85. Extending rigidly from the jaws in an upward direction are the jaw shanks or levers 86 which may conveniently be of rectangular section, and are accommodated in suitable radial slots or grooves 87 formed in the outside surface of the body. Suitable lugs 88 formed at the sides of the grooves 87 carry the fulcrum pins 89 on which the jaw shanks are mounted. The top ends of the jaw shanks have inward radial projections 90 and are also provided with chamfered portions 91. The inner ends of the radial projections 90 of the jaw shanks abut upon the conical portion of the plunger 92 which encircles the screw-driving spindle and has its bottom end accommodated in a cylindrical recess formed in the top end of the body 63. The top end of the plunger extends upward in the form of a small tube, and upon it is secured the plunger cap 93 the edges of which extend downward so as to abut upon the chamfered portion 91 of the jaw levers. A spiral spring 94 tends to force upward the plunger 92 so that its conical portion presses the top ends of the jaw levers outward and so hold the jaws closely shut.

The action of this device will be easily understood and is as follows:—The screw-driving spindle being in the raised position shown in Fig. 1, a screw is caused to slide point first down the supply tube 63 and falls into the nozzle, its point protruding through the small central hole 85. The operator lowers the revolving screw-driving spindle so that its end comes in contact with the head of the screw, engaging the slot and driving the screw into the work. As the screw is being driven into the work the boss or collar on the descending screw-driving spindle, comes in contact with and presses upon the top of the plunger cap 93, compressing the spring 94 and removing the conical part of the plunger from its contact with the inward extensions 90 of the jaw levers, as shown in Fig. 14. At the same time the edge of the plunger cap 93 descending upon the chamfered parts 91 of the jaw levers, draws them inward and thus opens the jaws, allowing the head of the screw to pass out of the nozzle. Should a faulty screw, as hereinbefore referred to, be allowed to slide into the nozzle, and should such screw on being engaged by the screw-driver require more room in which to revolve than is normally provided in the nozzle, then the screw expands the nozzle to accommodate itself, and this is accomplished without any distortion or injury to the mechanism by reason of the extra pressure of the inward projections 90 upon the conical part of the plunger 92 causing the said plunger to be depressed, slightly compressing the spring 94. This spring re-asserts itself and reduces the nozzle to its normal size as soon as the faulty screw has been passed. Should a screw allowed to slide down the supply tube into the nozzle be incapable of being driven, as for instance by reason of its having no slot or being introduced head-foremost, the operator may remove such screw without delay, merely by applying manual pressure to the plunger cap 93 which, as will be understood from the description hereinbefore set forth, causes the jaws to open and allows the screw to fall out.
I have found it to be the case that a considerable proportion of ordinary commercially produced screws have the slots cut in their heads somewhat out of center, and I therefore provide improved means for enabling such faulty screws to be readily engaged with the screw-driver. For this purpose I provide the screw-driver with a movable or floating blade, which normally coincides with a diametral line across the working end of the screw-driver, but which may be deflected to one or either side of such diametral line when brought into contact with an eccentrically slotted screw head.

In Figs. 17–19 (which are drawn to an enlarged scale) 95 is the screw-driving blade which is formed upon the under side of the flange or disk 96. Extending from the top side of the said flange 96, and diametrally at right angles to the blade 95, is the flat shank 97, which is accommodated in the slot 98 formed in the end of the spindle 23. The bifurcated end of the spindle abuts upon the top side of the flange 96. The floating tip, which, it will be seen, consists of the blade 95, flange 96 and shank 97, is usually made from a solid piece of steel of the same diameter as the flange 96, and this is somewhat less than the diameter of the spindle 23 so that the shank 97 may slide transversely in the slot 98 to the extent of this difference of diameters, without protruding outside the circumference of the spindle 23. The floating tip is maintained in place, and has its movements limited by a pin 100 which passes through a suitable slotted hole 101 cut in the shank 97, and has its ends rigidly secured in those portions of the spindle end which form the sides of the slot 98. In order to give the floating tip a tendency to remain in or return to a central position, I may, if necessary provide a suitable indent in the top of the shank 97 in combination with a small spring-inforced plunger such as 102, accommodated in a central hole extending upward from the slot 98.

What I claim as new and desire to secure by Letters Patent is:—

1. In a screw driving device the combination of a magazine for screws, a screw driving tool, a means for delivering and properly holding screws in operative relation to said tool, and a member forming the sufficient and sole support for said magazine, said screw driving and holding means and said tool, which member is constructed and arranged to be applied and secured to and to receive its support from a rotary spindle, the arrangement being such that the screw-driving device may be bodily lowered toward or raised from the work by imparting vertical movement to said spindle, and that said tool may be rotated by said spindle.

2. The combination of a rotary spindle, a tubular supporting member secured to said spindle, a magazine for screws, a screw-driving tool, and means for delivering and properly holding screws in operative relation to said tool; said magazine, tool, and screw delivering and holding means being all mounted on and supported exclusively from said tubular supporting member, and so constructed and arranged that said screw driver may be rotated by said spindle.

3. In a screw driving device the combination of a magazine for screws, a screw driving tool, a means for delivering and properly holding screws in operative relation to said tool, and a member forming the sufficient and sole support for said magazine, screw delivering and holding means and tool, a rotatable spindle adapted to engage and support said supporting member, a screw selecting means and a means adapted to be operated by a relative movement of the said screw delivering and holding means, and the magazine for causing the delivery of a screw.

4. In a screw driving device the combination of a magazine for screws, a screw driving tool, a means for delivering and properly holding screws in operative relation to said tool, and a member forming the sufficient and sole support for said magazine, screw driving and holding means and tool, a rotatable spindle adapted to engage and support said supporting member, an escapement device for permitting of the delivery of a screw by gravity to the screw delivery and holding means, and a bell crank lever for actuating said escapement device, said bell crank lever having a part so located as to be tripped by a relative movement of the screw delivering and holding means with reference to the magazine.

5. In a screw-driving device the combination of a magazine for screws, a screw driving tool, a means for delivering and properly holding screws in operative relation to said tool, and a member forming the sufficient and sole support for said magazine, screw driving and holding means and tool, a rotatable spindle adapted to engage and support said supporting member, said magazine having an escape outlet for permitting of the delivering of the screws therethrough singly, and means for imparting a jigging movement to said magazine, so as to shake the screws toward said outlet opening.

6. In a screw-driving device the combination of a magazine for screws, a screw driving tool, a means for delivering and properly holding screws in operative relation to said tool, and a member forming the sufficient and sole support for said magazine, screw driving and holding means and tool, a rotatable spindle adapted to engage and support said supporting member, said magazine having an escape outlet for permitting of the delivering of the screws therethrough singly, an eccentric revoluble with the aforesaid supporting member, and connected with said magazine for imparting a sifting motion to the latter.

7. In a screw driving machine the combination of a spindle, a supporting member, supported and adapted to be rotated by said spindle, an eccentric carried by and rotatable with said supporting member, a magazine for screws carried by said eccentric, and adapted to be jigged, but not rotated thereby, a screw driving tool carried by said supporting member, means suspended from said supporting member, and adapted to receive and deliver a screw and hold same in operative relation to said tool, and means supported by said magazine for releasing a screw from said magazine and delivering said screw to the receiving and delivering means.

8. In a screw-driving apparatus the combination of a tubular shank having at one end thereof means for enabling it to be connected with a driving spindle, a magazine for screws entirely supported by and surrounding said shank, a screw driver in alinement with or supported by said shank, said screw driver being so connected with the shank as to be longitudinally movable relatively to same, means for normally resisting such movement in one direction, a guiding tube loosely embracing the end of said screw driver remote from the aforesaid tubular shank, an open hopper carried by said guide tube and communicating therewith at a point normally beyond the end of said screw driver, a feed nipple depending from the aforesaid magazine and vertically in alinement with the mouth of said hopper but normally unconnected therewith, supporting means for suspending said guide tube from the aforesaid tubular shank, and adapted to permit said guiding tube with its hopper to be relatively movable toward and from said feed nipple, means normally preventing a screw from passing through said feed nipple, and means adapted to be tripped by the aforesaid relative movement of the hopper for releasing the screw.

In testimony whereof I affix my signature in presence of two witnesses.

FREDERIC WILLIAM RUSSELL.

Witnesses:
H. C. HUGGINS,
ERNEST HARKER.